United States Patent [19]

Rohr

[11] 4,371,212
[45] Feb. 1, 1983

[54] WHEEL RIM BOLT ATTACHMENT

[75] Inventor: Jakob Rohr, Schaffhausen, Switzerland

[73] Assignee: George Fischer Aktiengesellschaft, Switzerland

[21] Appl. No.: 148,165

[22] Filed: May 8, 1980

[30] Foreign Application Priority Data

Sep. 5, 1979 [CH] Switzerland ............ 4343/79

[51] Int. Cl.³ .............................. B60B 23/10
[52] U.S. Cl. ........................ 301/9 DN; 301/12 R
[58] Field of Search ............ 301/10 R, 9 DN, 11 R,
301/12 R, 18–20, 22–24, 105 R, 90 R, 9 AN, 9
DP, 9 SB, 6 S, 113; 403/261, 155, 379, 326;
295/43; 411/513–515, 401

[56] References Cited

U.S. PATENT DOCUMENTS

| 639,337 | 12/1899 | Anthony | 301/113 X |
|---|---|---|---|
| 1,552,571 | 9/1925 | Sanford | 301/113 |
| 2,002,290 | 5/1935 | Kriel et al. | 301/12 R |

FOREIGN PATENT DOCUMENTS 466733 1/1969 Switzerland .
471695 6/1969 Switzerland .
474379 8/1969 Switzerland .

Primary Examiner—Charles A. Marmor
Attorney, Agent, or Firm—Roylance, Abrams, Berdo & Farley

[57] ABSTRACT

Replaceable T-head bolt for attaching a wheel rim to a wheel body are mounted in the body with the head positioned in a U-shaped recess having side surfaces and a bottom wall through which the bolt shaft extends. A washer on the bolt is held by a cotter pin passing through a hole in the bolt which is angularly offset from the long dimension of the T head. The washer is positioned by shoulders on the outside of the bottom wall, the shoulders having different heights. An L-shaped slot permits lateral insertion of the bolt head after which it is rotated 90°.

5 Claims, 3 Drawing Figures

WHEEL RIM BOLT ATTACHMENT

The present invention relates to an improved apparatus for attaching a wheel rim to a wheel body and, in particular, to an apparatus for supporting replaceable bolts to hold wheel rims, particularly in heavy trucks and buses.

BACKGROUND OF THE INVENTION

It is known to provide a wheel structure, especially on heavy vehicles, including replaceable bolts for holding the wheel rims on the bodies, the wheel body being that portion of the structure which is attached to the axle of the vehicle. Replaceable bolts, rather than welded studs, are used because the bolts are subject to fracture and must be replaced from time to time.

The bolts thus used are connected in some fashion to the wheel body and must be retained in a position parallel with the wheel axis, even when the tire-carrying rim is removed. Examples of such devices are shown in Swiss Pat. Nos. 466,733; 471,695; and 474,379.

In each of these cases, the bolts extend from the inner side of the wheel body through the body wall to the exterior of the wheel body, leaving exposed threaded portions of the bolts so that the wheel rims can placed thereon and attaching nuts can be threaded on to the exposed stud-like portions to retain the rim. As previously indicated, in order to facilitate mounting of the rims, it is important that the bolts extend parallel to the wheel axis. If the heads of the bolts bear against the inner side of the wheel body wall only, as shown for example in Swiss Pat. No. 471,695, the bolts must be held against the outside of the wall in some fashion, such as shown in Swiss Pat. No. 474,379, in which example nuts and clamps are employed. Without such retaining mechanisms, or the equivalent, the bolts would not remain parallel and alignment of the rim holes with the threaded portions of the bolts would be extremely difficult.

However, such nuts and clamps have the disadvantages that they are difficult to fasten when the bolts extend through a pan-shaped portion of the wheel body. Furthermore, in the case of the clamp, it is necessary to employ a special tool in order to remove and replace the clamp on the bolt.

It is normally impractical to use a resilient element such as a spring between the bolt head and a wall because such elements, including those made of rubber, tend to loosen rather easily if not supported on two or more sides.

BRIEF DESCRIPTION OF THE INVENTION

Accordingly, a primary object of the present invention is to provide an arrangement for fastening wheel rims to a wheel body wherein fastening bolts mounted on the wheel body can be fastened and removed easily and retained in an orientation parallel with the wheel axis when the wheel rims are removed.

A further object is to provide such an apparatus in which the mounting bolts can be attached and removed by using conventional tools so that no special tools are required.

Briefly described, the invention includes an improved apparatus for attaching a wheel rim to a wheel body on a vehicle, such as a truck or bus, the wheel body being of the type having a plurality of support means around the periphery of the wheel body, each support means including a first wall lying in a plane substantially perpendicular to the wheel axis, a second wall extending perpendicularly from said first wall, and means defining a continuous, generally L-shaped slot extending into both of said walls, the apparatus including a T-head bolt, said slot being dimensioned to permit passage of the smaller dimension of the T head therethrough but to prevent passage of the larger dimension of the head, so that the head can be inserted through the slot and rotated 90 degrees to bring the bottom surfaces of the head into contact with the inner side of the first wall on both sides of the slot, the improvement comprising a washer, the first wall including means defining a first shoulder on one side of the slot and a second shoulder on the other side of the slot, the shoulders being engagable with the washer for positioning thereof, the bolt including means defining a diametral hole through said bolt spaced from the bottom surfaces of the head, the axis of the hole being angularly offset from the longer dimension of the head, and fastener means insertable through said hole for preventing said washer from moving axially along said bolt away from said first wall.

The arrangement according to the invention has the advantage that it absolutely prevents longitudinal movement of the bolt in the slot.

Furthermore, the fastener means, which can be a split cotter pin, can be inserted and removed without the assistance of a special tool.

The washer prevents loosening of the bolt until removal of the cutter pin which can be inserted by means of a conventional hammer and removed by conventional pliers. As will be recognized from the prior art, a bolt held by a clamp can be loosened by normal vibration.

As compared with the known design in which the bolt is held against the first wall by means of a nut, the invention has the advantage that the required thread length of the bolt is much shorter. Furthermore, the problems associated with the mounting of a nut in a pan-shaped structural portion of the wheel body are avoided.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF THE INVENTION

Figure 3:
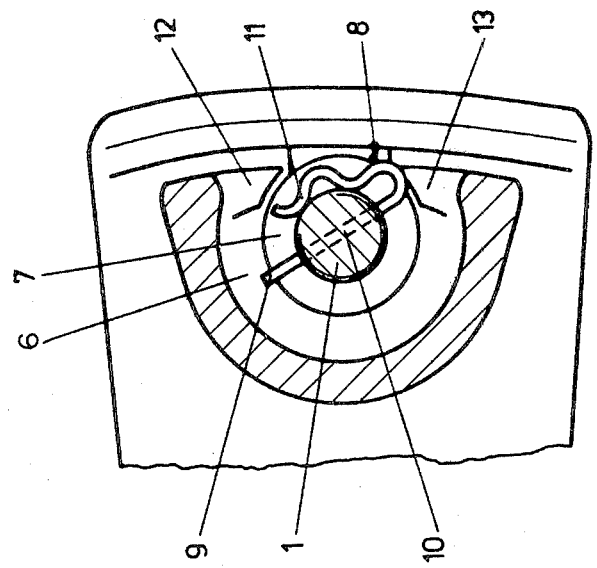
FIG. 3 is a transverse sectional view along line III—III of FIG. 2.
Figure 2:
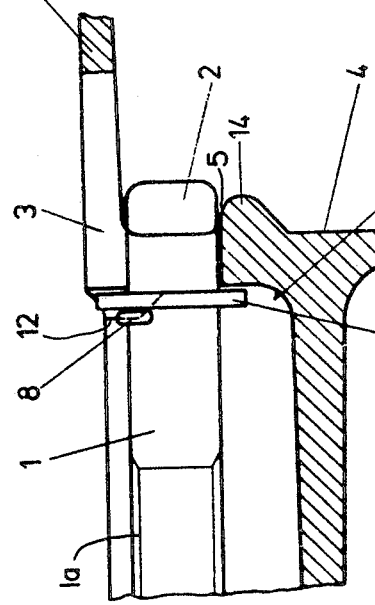
FIG. 2 is a side elevation, in partial section, along line II—II of FIG. 1.
Figure 1:
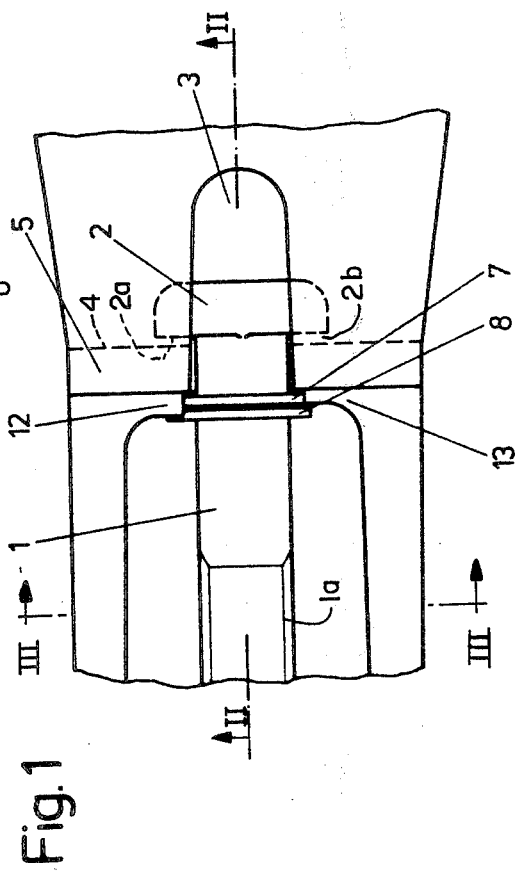
FIG. 1 is a partial, top plan view of a support and bolt arrangement in accordance with the invention.

As seen in FIGS. 1 and 2, a bolt 1 with a T-head or hammer head 2 has been inserted through a slot 3 and thereafter rotated through an angle of 90 degrees so that the bottom surfaces 2a and 2b lie against the inwardly facing surfaces 4 of a first slot wall 5. A washer 7 is placed on the bolt 1 against the outer side 6 of the first wall 5. A split cotter pin 8 is placed through a diametral hole 10, passing through the bolt against the side of washer 7 away from the head. As best seen in FIG. 3, one leg 9 of cotter pin 8 passes through the hole and the other leg 11, which is bent into a generally sinuous configuration, passes around the outside of the bolt and presses against the bolt to hold the pin in place. With the hole 10 in a position so that the clearance between washer 7 and cotter pin 8 is relatively small, this assembly holds the bolt 1 firmly in position.

With the bolt thus positioned, the threaded portion 1a extends axially in a direction parallel to the central axis of the wheel body, the distal end thereof being available to receive the wheel rim. A plurality of such bolts, circularly spaced apart around the wheel body, are positioned to be aligned with holes in the wheel rim.

In order to prevent loosening of bolt 1, particularly if the clearance between the cotter pin and washer is larger, two shoulders 12 and 13 are formed on the first wall 5, which shoulders restrict the possible movement of washer 7 and, consequently, bolt 1. For this purpose, the first shoulder 12 protrudes further away from wall 5 than a second shoulder 13 so that the thickness of shoulder 12 exceeds the thickness of the washer. The height of the second shoulder 13 does not exceed the thickness of washer 7. The hole 10 is drilled through the bolt along a line which is angularly displaced from the longitudinal dimension of the T-head of the bolt to permit the cotter pin 8 to be inserted over the second shoulder 13 as seen in FIG. 3, the angle displacement preferably being on the order of 30 degrees. With the provisions of shoulders 12 and 13, the bolt 1 is prevented from getting loose from the position shown.

In the embodiment shown, the bolt 1 is prevented from turning since one surface on the elongated side of the head 2 of the bolt lies against the inner surface of a second wall 15 on both sides of slot 3 passing therethrough. The second wall 15 extends perpendicularly with respect to the first wall 5. In order to improve the support of head 2 a projection 14 (FIG. 2) can be provided along the other longitudinal side of the head 2 opposite second wall 15 and parallel to it. In this way the head 2 is held on both of its longitudinal sides. In this way also the pressure of the head 2 against the second wall 15 is reduced.

As will be recognized from the above, the T-head of the bolt lies in a generally U-shaped cavity formed by the generally parallel walls including the inner surface of wall 15 and surface 5, the bottom of the U-shaped cavity being surface 4 against which the bottom surfaces 2a and 2b rest.

The arrangement according to the invention facilitates the mounting of wheel rims onto a wheel body and also substantially reduces the time required for the mounting. If required, the bolts can be replaced very quickly and, once in position, they always extend perpendicularly to the wheel body.

One advantageous embodiment has been choosen to illustrate the invention it will be understood by those skilled in the art that various changes and modifications can be made therein without departing from the scope of the invention as defined in the appended claims.

What is claimed is:

1. An improved apparatus for attaching a wheel rim to a wheel body on a vehicle, such as a truck or bus, the wheel body being of the type having a plurality of support means around the periphery of the wheel body, each support means including a first wall lying in a plane substantially perpendicular to the wheel axis, a second wall extending perpendicularly from said first wall, and means defining a continuous, generally L-shaped slot extending into both of said walls, the apparatus including a T-head bolt, said slot being dimensioned to permit passage of the smaller dimension of the T-head therethrough but to prevent passage of the larger dimension of the head, so that the head can be inserted through the slot and rotated 90° to bring the bottom surfaces of the head into contact with the inner sides of the first wall on both sides of the slot, the improvement comprising a washer;

said first wall including means defining a first shoulder on one side of the slot and a second shoulder on the other side of said slot, said shoulders being adjacent the juncture of said first and second walls and engagable with said washer for positioning thereof and being spaced apart by a distance less than the outer diameter of said washer, the height of said first shoulder being greater than the thickness of said washer and the height of said second shoulder being less than the thickness of said washer;

said bolt including means defining a diametral hole through said bolt spaced from the bottom surfaces of said head by a distance substantially equal to the combined thicknesses of said first wall and said second shoulder, the axis of said hole being angularly offset from the longer dimensions of said head; and fastener means insertable through said hole for preventing said washer from moving axially along said bolt away from said first wall.

2. An apparatus according to claim 1 wherein said fastener means comprises a split cotter pin.

3. An apparatus according to claim 1 wherein said first and second shoulders are located adjacent an end of said slot in said first wall radially remote from said wheel axis.

4. An apparatus according to claim 1 wherein said axis of said hole in said bolt is angularly offset from the longer dimension of said head by an angle of about 30°.

5. An apparatus according to claim 1 wherein one leg of said cotter pin has a generally sinuous configuration.

* * * * *